United States Patent [19]

Maida

[11] 3,961,342
[45] June 1, 1976

[54] REMOTE CONTROL PHOTOGRAPHIC APPARATUS

[75] Inventor: Osamu Maida, Tokyo, Japan

[73] Assignee: Nippon Kogaku K.K., Tokyo, Japan

[22] Filed: Oct. 10, 1974

[21] Appl. No.: 513,868

[30] Foreign Application Priority Data

Oct. 12, 1973 Japan.................. 48-118000[U]

[52] U.S. Cl.............................. 354/60 R; 354/131; 354/238
[51] Int. Cl.²........................................... G03B 9/64
[58] Field of Search............. 354/50, 51, 60 R, 131, 354/238; 343/225

[56] References Cited
UNITED STATES PATENTS

| | | |
|---|---|---|
| 3,295,426 | 1/1967 | Land et al............................ 354/131 |
| 3,686,672 | 8/1972 | Ishizuka.............................. 354/238 |
| 3,818,499 | 6/1974 | Brandt................................ 354/238 |
| 3,827,067 | 7/1974 | Yamamichi.......................... 354/51 |

Primary Examiner—L. T. Hix
Assistant Examiner—Russell E. Adams, Jr.
Attorney, Agent, or Firm—Shapiro and Shapiro

[57] ABSTRACT

Remote control apparatus for cameras having an automatic exposure control circuit and a mechanism for operating the shutter and advancing the film in the camera comprises a first circuit responsive to a remotely generated photography signal for generating a first control signal to actuate the automatic exposure circuit and a delay circuit for generating a second control signal delayed relative to the first control signal to actuate the shutter-operating and film-advancing mechanism.

7 Claims, 3 Drawing Figures

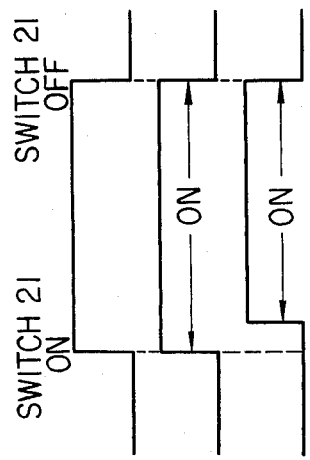
FIG. 2(a) SIGNAL
FIG. 2(b) TRANSISTOR 50
FIG. 2(c) TRANSISTOR 47
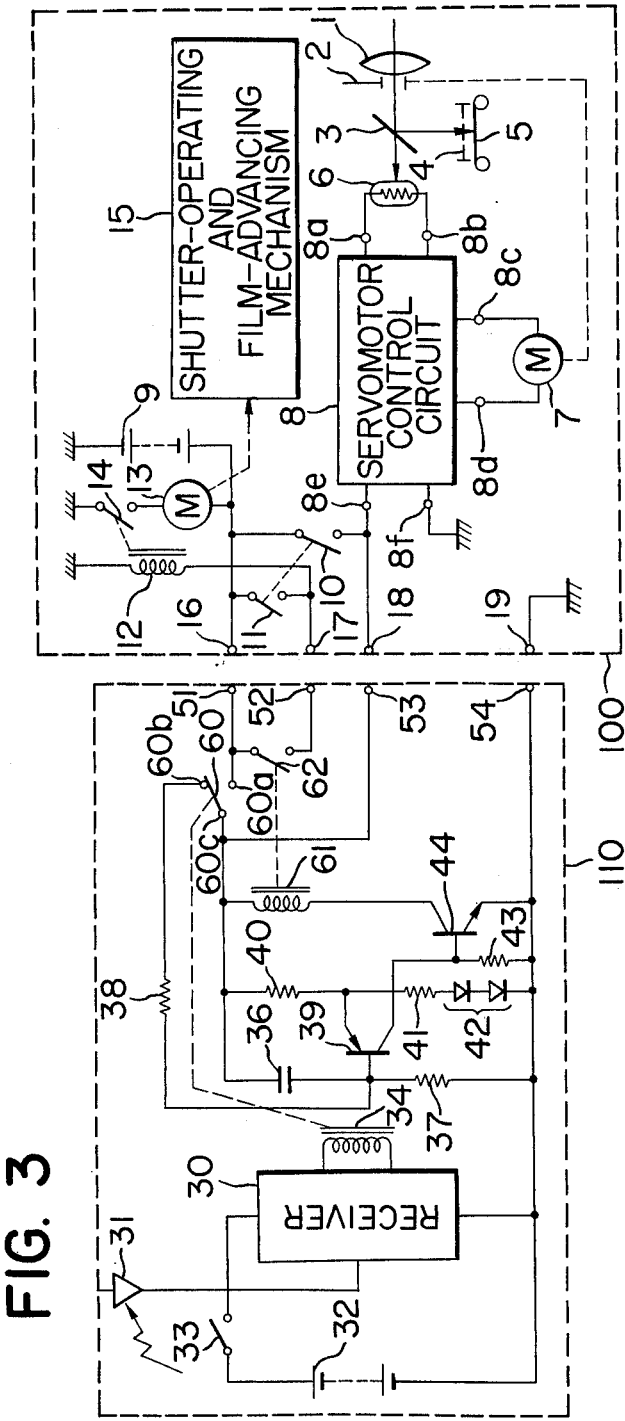
FIG. 3

REMOTE CONTROL PHOTOGRAPHIC APPARATUS

BACKGROUND OF THE INVENTION

Field of the Invention

This invention relates to remote control photographic apparatus, and is more particularly concerned with apparatus responsive to remotely generated photography signals for controlling cameras having an automatic exposure control system and a motor-driven mechanism for operating the shutter and advancing the camera film.

DESCRIPTION OF THE PRIOR ART

In conventional motor-driven still cameras and movie cameras of the type wherein exposure is automatically controlled by a servomotor responsive to a photoelectric element and wherein the mechanism for operating the shutter and advancing the camera film is driven by an additional motor, the servomotor for the automatic exposure control system is energized prior to energizing the motor for the shutter-operating and film-advancing mechanism in order to ensure proper exposure of the camera film. In such cameras, the servomotor is energized when the shutter release button has been depressed to a first position thereby to adjust an exposure-controlling device of the camera, such as an adjustable diaphragm. When the shutter release button is further depressed to a second position, the motor for the shutter-operating and film-advancing mechanism is energized to initiate photography.

SUMMARY OF THE INVENTION

It is an object of the present invention to provide improved remote control photographic apparatus.

It is a further object of the present invention to provide remote control apparatus responsive to remotely generated photography signals for controlling cameras having an automatic exposure control system and a mechanism for operating the camera shutter and for advancing film in the camera.

Remote control apparatus in accordance with the invention for controlling cameras having an automatic exposure control circuit and a mechanism for operating the shutter and advancing the film in the camera comprises a first circuit responsive to a remotely generated photography signal, such as a radio signal, for generating a first control signal to actuate the automatic exposure control circuit and a second circuit for generating a second control signal, delayed relative to the first control signal, to actuate the shutter-operating and film-advancing mechanism.

BRIEF DESCRIPTION OF THE DRAWINGS

The invention will be further described with reference to the accompanying drawings, which illustrate preferred and exemplary embodiments, and wherein:

FIGS. 2(a) – 2(c) are explanatory waveform diagrams; and

FIG. 3 is an electrical circuit diagram of a second embodiment of the remote control photographic apparatus in accordance with the invention.

DESCRIPTION OF THE PREFERRED EMBODIMENT

Figure 1:
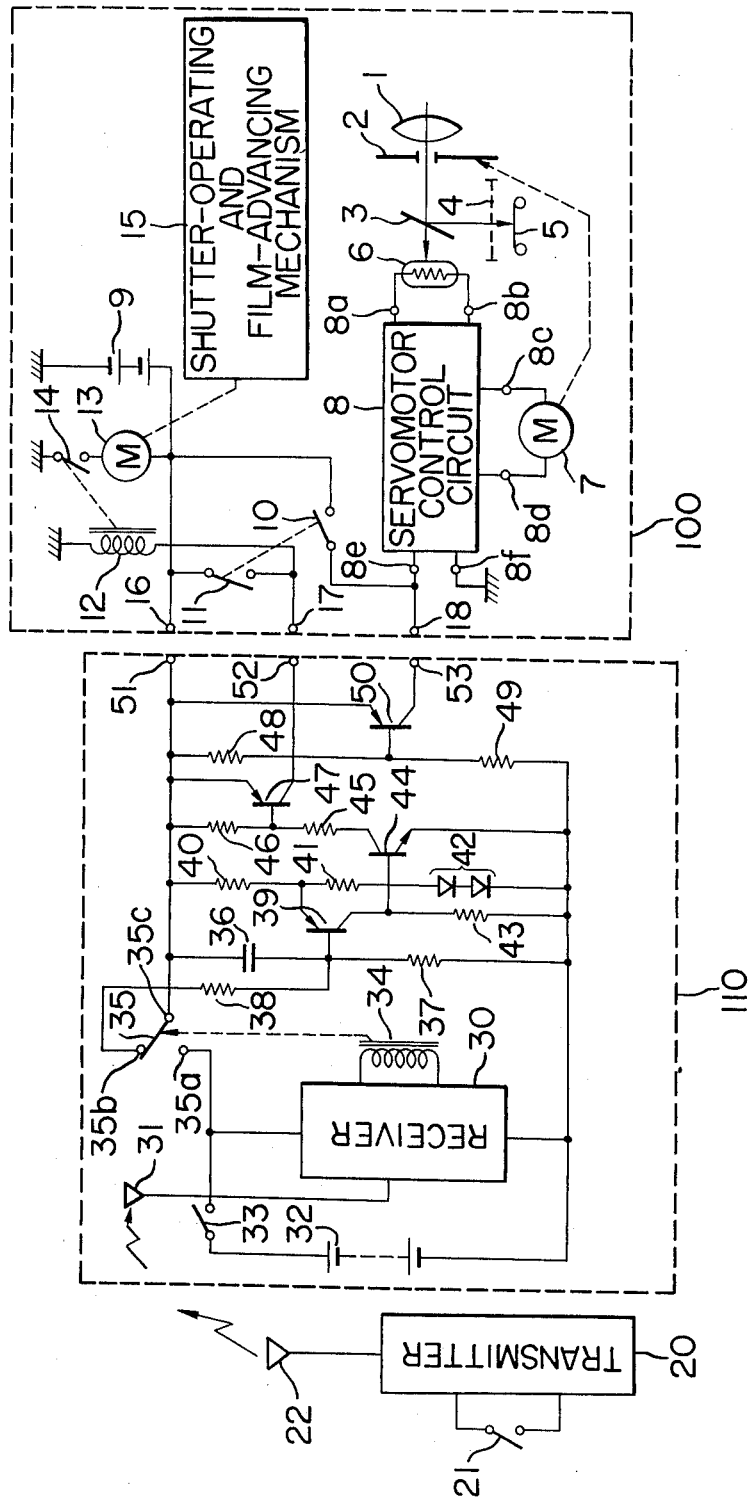
FIG. 1 is an electrical circuit diagram, partly in schematic and partly in block form, showing a first embodiment of the remote control photographic apparatus in accordance with the invention.

Referring to the drawings, the remote control photographic apparatus in accordance with the invention, which can employ still cameras or motion picture cameras having an automatic exposure control circuit and a mechanism for operating the shutter and advancing the camera film, will be described with reference to a motion picture camera 100.

Referring to FIG. 1, motion picture camera 100 includes an objective lens 1, an adjustable diaphragm 2, and a beam-splitting mirror 3 which splits light from an object which passes through the objective lens and the diaghragm into two components. One component of the light passes through the mirror to strike a photoelectric element 6, such as a CdS cell, while the other component of the light is reflected by the mirror onto a shuttet 4, the camera film 5 being located behind the shutter.

The photoelectric element 6 is connected between input terminals 8a and 8b of a servomotor control circuit 8, which is conventional in design and which controls a servomotor 7 having its electrical input terminals connected to respective output terminals 8c and 8d of the control circuit. The output shaft of the servomotor is coupled to exposure control means, such as the aforementioned adjustable diaphragm 2, for ensuring proper exposure of the camera film. Servomotor 7, control circuit 8, photoelectric element 6 and diaphragm 2 together comprise the automatic exposure control system of the camera.

The positive terminal of power source 9, which provides DC operating potential for the camera, is connected to a power input terminal 8e of control circuit 8 through a switch 10, a second power input terminal 8f of the control circuit being connected to a source of reference potential or ground. A second switch 11 has one contact connected to the positive terminal of power source 9 and has its other contact connected to one end of a relay coil 12, the other end of the coil being connected to ground. The relationship between the first and second switches is such that when the shutter release button (not shown) is depressed to a first position, switch 10 closes to connect power supply terminal 8e of the servomotor control circuit to the positive terminal of power source 9. Switch 10 remains closed as the shutter release button is further depressed to a second position wherein switch 11 closes to connect the ungrounded end of relay coil 12 to the positive terminal of the power source.

A drive motor 13 has its output shaft coupled to a mechanism 15 for operating shutter 4 and for advancing film 5 to effect photography. One electrical terminal of the motor is connected to the positive terminal of power source 9, while the other electrical terminal of the motor is connected to ground through a relay switch 14 which is controlled by relay coil 12.

The camera is further provided with electrical input connectors 16, 17 and 18 which are respectively connected to the positive terminal of the power source, the ungrounded terminal of relay coil 12, and the power input terminal 8e of servomotor control circuit 8.

Operation of the motion picture camera will now be described. To initiate motion picture photography, the shutter release button (not shown) is manually depressed. When the shutter release button has been depressed sufficiently to close switch 10, current flows from power source 9 through switch 10 to energize servomotor control circuit 8, which controls servomotor 7 so that the adjustable diaphragm 2 is set to enable proper exposure of the camera film. When the shutter release button is further depressed to close switch 11, current from power source 9 is able to flow through switch 11 to energize relay coil 12. This causes switch 14 to close to energize motor 13 which drives the shutter-operating and film-advancing mechanism to effect continuous photography.

When the shutter release button is thereafter released, switches 10 and 11 open to terminate photography. Specifically, the opening of switch 10 causes power input terminal 8e of servomotor control circuit 8 to be disconnected from the positive terminal of power source 9, while the opening of switch 11 causes relay coil 12 to become de-energized, which in turn causes relay switch 14 to open to de-energize motor 13.

FIG. 1 illustrates a first embodiment of remote control apparatus 110 in accordance with the invention for controlling motion picture camera 100 in response to a remotely generated photography signal, which may comprise a radio signal transmitted by the antenna 22 of a remote transmitter 20 when transmitting switch 21 is closed. When the photography signal comprises a transmitted radio signal, the remote control apparatus includes a radio-frequency receiver 30 of conventional design having an antenna 31 for receiving the photography signal. A first power input terminal of the receiver is connected through a power switch 33 to the positive terminal of a power source 32, providing DC operating potential, a second power input terminal of the receiver being connected to the negative terminal of power source 32. A relay coil 34 is connected between two output terminals of receiver 30 for being energized in response to the received photography signal. In the illustrated embodiment, the photography signal, illustrated by FIG. 2(a), is a pulse having a duration corresponding to the desired duration of photography and relay coil 34 remains energized for the entire duration of the photography signal. However, the photography signal may comprise a first pulse for initiating photography followed by a second pulse for terminating photography, in which case the relay coil 34 may be of the type which is energized in response to a first pulse and is thereafter de-energized in response to a second pulse.

The movable contact 35c of a relay switch 35 is controlled by relay coil 34 such that it engages fixed contact 35a while relay coil 34 is energized and engages fixed contact 35b while the relay coil is de-energized. Contact 35a is connected to the positive terminal of power source 32 through power switch 33. Contact 35b is connected through a resistor 38 to the junction of a capacitor 36 and a resistor 37 which are connected in series between switch contact 35c and the negative terminal of power source 32. Capacitor 36 and resistor 37 together constitute an integrating or delay circuit. A transistor 39 has its base connected to the junction of capacitor 36 and resistor 37. The emitter of the transistor is connected to the junction of resistors 40 and 41, which are connected in series with each other and with a pair of diodes 42 between switch contact 35c and the negative terminal of power source 32. The collector of the transistor is connected to the negative terminal of power source 32 through a resistor 43. Transistor 39 is rendered conductive when the potential developed across capacitor 36 reaches a predetermined value and is non-conductive for potentials less than the predetermined value.

Diodes 42 are provided to eliminate any irregularity in the integration time of the delay circuit which would otherwise result from variations of the potential of power source 32. The diodes are therefore selected such that the voltage $V_D$ produced across the diodes when current flows therethrough in the forward direction satisfies the following equation:

$$V_D = V_{BE} \frac{R40 + R41}{R40},$$

where R40 and R41 are the resistance values of resistors 40 and 41, respectively, and $V_{BE}$ is the base-to-emitter voltage of transistor 39.

A transistor 44 has its base connected to the collector of transistor 39, has its emitter connected to the negative terminal of power source 32, and has its collector connected to switch terminal 35c through resistors 45 and 46, which are connected in series. The resistance value of resistor 43 is selected such that transistor 44 conducts when transistor 39 is rendered conductive. A transistor switch 47 has its base connected to the junction of resistors 45 and 46, has its emitter connected to switch contact 35c, and has its collector connected to an output connector 52. The resistance values of resistors 45 and 46 are selected such that transistor 47 conducts when transistor 44 is rendered conductive.

Resistors 48 and 49 are connected in series between switch contact 35c and the negative terminal of power source 32 to provide a voltage divider between those points. A transistor switch 50 has its base connected to the junction of resistors 48 and 49 and has its emitter connected to switch contact 35c, which is also connected to an output connector 51. The collector of transistor 50 is connected to an output connector 53. The resistance values of resistors 48 and 49 are selected such that transistor 50 is rendered conductive when switch contact 35c makes contact with switch contact 35a, provided that power switch 33 is closed.

When output connectors 51, 52 and 53 of the remote control apparatus 110 are electrically coupled to input connectors 16, 17 and 18, respectively, of camera 100, the emitter-collector path of transistor 50 is connected in parallel with switch 10 of the camera and the emitter-collector path of transistor 47 is connected in parallel with switch 11 of the camera.

In operation of the remote control apparatus 10 with motion picture camera 100, power switch 33 is initially closed to energize radio-frequency receiver 30. When a transmitted photography receiver 30 energizes relay coil 34 so that switch contact 35c is shifted from switch contact 35b to switch contact 35a, which is connected to the positive terminal of power source 32 through the closed power switch 33. With the voltage divider resistors 48 and 49 thereby connected between the terminals of power source 32, transistor 50 is rendered conductive, as shown in FIG. 2(b), to provide a control signal at output connector 52 for actuating the automatic exposure control circuitry. Specifically, when transistor 50 is conductive, current flows from the positive terminal of power source 9 of the camera through connectors 16 and 51, transistor 50, and connectors 53 and 18 to the power input terminal 8e of servomotor control circuit 8. The control circuit is thereby energized to control servomotor 7 in accordance with the intensity of light detected by photoelectric element 6 so that the diaphragm is adjusted to enable proper exposure of the camera film.

Furthermore, the shift of switch contact 35c to switch contact 35a permits capacitor 36, which was previously maintained in a discharged condition by resistor 38, to be charged by power source 32 through resistor 37. When the capacitor has been charged for a predetermined time interval, the potential across the capacitor reaches a level sufficient to cause transistor 39 to switch into conduction, which in turn causes transistors 44 and 47 to become conductive. Transistor 47, when rendered conductive, thereby provides a control signal at output connector 52 for actuating the shutter-operating and film-advancing mechanism 15 of the camera. More particularly, conduction of transistor 47, which is delayed relative to conduction of transistor 50 by the time interval required to charge capacitor 36 to the potential for switching transistor 39 into conduction, as shown in FIGS. 2(b) and 2(c), enables current to flow from the positive terminal of power source 9 in the camera through connectors 16 and 51, transistor 47 and connectors 52 and 17 to energize relay coil 12, which causes relay switch 14 to close. When relay switch 14 is closed, motor 13 is energized mechanism 15, thereby initiating photography. The capacitance of capacitor 36 and the resistance value of resistor 37 are selected such that the time interval between conduction of transistors 50 and 47 is sufficient to enable the automatic exposure control circuitry to complete adjustment of diaphragm 2 before photography is initiated.

Upon termination of the transmitted photography signal, transmitter 30 de-energizes relay coil 34 so that switch contact 35c shifts from switch contact 35a to switch contact 35b. With switch contact 35c thus disconnected from the positive terminal of power source 32, transistors 50 and 47 are simultaneously rendered nonconductive or OFF, as shown in FIGS. 2(b) and 2(c), so that photography is terminated. When switch contact 35c makes contact with switch contact 35b, capacitor 36 is discharged through resistor 38.

FIG. 3 illustrates a second embodiment of remote control apparatus in accordance with the invention. Like the first embodiment, this embodiment is responsive to a remotely generated photography signal in the form of a radio signal which may be produced by the transmitting apparatus 20, 21 and 22 illustrated by FIG. 1. Circuit elements corresponding to elements of the first embodiment are designated by the saame reference characters.

Motion picture camera 100 is similar to that of the first embodiment with the exception that a grounded input connector 19 is provided in addition to the three connectors 16, 17 and 18.

The remote control apparatus 110 includes a relay switch 60 controlled by relay coil 34 such that the movable contact 60c makes contact with a fixed contact 60a when the relay coil is energized (i.e., during reception of a photography signal) and makes contact with another fixed contact 60b when relay coil 34 is not energized. Switch contact 60c is connected to one side of capacitor 36, which has its other side connected to the negative terminal of power source 32 through resistor 37; to one end of resistor 40, which has its other end connected to the collector of transistor 39; to one end of a relay coil 61, which has its other end connected to the collector of transistor 44; and to output connector 53. Switch contact 60a is connected to output connector 51, while switch contact 60b is connected to one end of resistor 38, which has its other end connected to the junction of capacitor 36 and resistor 37.

Connected between output connectors 51 and 52 is a relay switch 62 which is closed only when relay coil 61 is energized. An output connector 54, adapted for coupling to input connector 19 of the camera, is connected to the negative terminal of power source 32.

When output connectors 51, 52, 53 and 54 of the remote control apparatus 110 are electrically connected to input connectors 16, 17, 18 and 19, respectively, of camera 100, switch contacts 60a and 60c provide a switch connected in parallel with switch 10 of the camera, while relay switch 62 is connected in parallel with switch 11 of the camera.

In operation of the remote control apparatus with the motion picture camera, power switch 33 is initially closed to provide operating potential for receiver 30. During reception of a photography signal, relay coil 34 is energized, as in the first embodiment, causing switch contact 60c to shift from switch contact 60b to switch contact 60a, thereby providing a control signal at output connector 53 for actuating the automatic exposure control system of the camera. More particularly, current flows from the positive terminal of a power source 9 of the camera through connectors 16 and 51, closed switch contacts 60a and 60c, and connectors 53 and 18 to power input terminal 8c of the servomotor control circuit 8, which is energized thereby to effect exposure control in the manner described with reference to the first embodiment.

Furthermore, when switch contact 60c makes contact with switch contact 60a, capacitor 36 of the delay circuit begins to be charged through these switch contacts and through resistor 37 by power source 9 of the camera. As in the first embodiment, transistor 39 is switched into conduction after a predetermined time interval when the potential at the junction of capacitor 36 and resistor 37 reaches a predetermined level. Transistor 44 conducts when transistor 39 is conductive so that current flows from the positive terminal of power source 9 through relay coil 61 and transistor 44 to energize the relay coil. Relay switch 62 closes when relay coil 61 is energized so that a control signal is provided at output terminal 52 for actuating the shutter-operating and film-advancing mechanism 15 of the camera. Specifically, closing of relay switch 62 enables current to flow from the positive terminal of power source 9 of the camera through connectors 16 and 51, relay switch 62, and connectors 52 and 17 to energize relay coil 12 in the camera. This causes relay switch 14 to close to energize drive motor 13 for the shutter-operating and film-advancing mechanism, thereby initiating photography.

Upon termination of the transmitted photography signal, receiver 30 de-energizes relay coil 34 so that switch contact 60c is shifted from contact 60a to contact 60b, thereby disconnecting switch contact 60c from the positive terminal of power source 9 of the camera. Power input terminal 8e of servomotor control circuit 8 is thus disconnected from the positive terminal of power source 9 of the camera, thereby de-energizing the automatic exposure control circuitry. At the same time, relay coil 61 becomes de-energized so that relay switch 62 is opened, causing relay coil 12 to be de-energized and causing relay switch 14 to be opened to de-energize motor 13, thereby terminating shutter operation and film advance.

In contrast to the first embodiment, wherein the circuit elements for producing the control signals in response to the received photography signal, are connected to a power source in the remote control apparatus, in the second embodiment to the power source provided by the camera.

In summary, the present invention provides remote control apparatus responsive to a single, remotely generated photography signal for actuating the shutter-operating and film-advancing mechanism of a camera at a predetermined time after actuation of the automatic exposure control system, thereby to ensure that the exposure is properly adjusted prior to initial shutter release.

While preferred embodiments of the invention have been shown and described, it will be apparent to those skilled in the art that changes can be made in these embodiments without departing from the principles and spirit of the invention, the scope of which is defined in the appended claims.

The invention claimed is:

1. Remote control apparatus for use with a camera having an exposure control system for automatically controlling film exposure, a mechanism for operating a camera shutter and advancing film, first switch means operable for actuating said system, second switch means operable for actuating said mechanism, a manually moveable button, and means coupling the button to both of said switch means for sequentially operating the first switch means and then the second switch means in response to manual movement of the button, said apparatus comprising:

third switch means operable for actuating said system;

fourth switch means operable for actuating said mechanism;

receiver means for producing an output signal in response to a remotely generated photography signal; and means responsive to said output signal for sequentially operating said third switch means and then said fourth switch means, whereby said exposure control system is actuated before said mechanism for operating the shutter and advancing the film.

2. Remote control apparatus according to claim 1 wherein said signal responsive means includes:

a delay circuit responsive to said output signal for producing a time-variable signal that reaches a threshold level subsequent to the start of the output signal; and a threshold circuit for causing said fourth switch means to operate when the time-variable signal reaches the threshold level.

3. Remote control apparatus according to claim 1, wherein said third switch means and said fourth switch means are connected in parallel with said first switch means and said second switch means, respectively.

4. Remote control apparatus according to claim 1, wherein said camera includes a power supply connected to said system and said mechanism in response to operation of said first switch means and said second switch means, respectively.

5. Remote control apparatus according to claim 1, wherein each of said third switch means and said fourth switch means comprises a semiconductor switch.

6. Remote control apparatus according to claim 5, wherein said remote control apparatus includes power supply means for controlling the operation of said semiconductor switches.

7. Remote control apparatus according to claim 1, wherein said fourth switch means comprises a semiconductor switch and wherein said camera includes power supply means for energizing said semiconductor switch.

* * * * *